United States Patent [19]

Noda et al.

[11] Patent Number: 5,084,851

[45] Date of Patent: Jan. 28, 1992

[54] OPTICAL HEAD FOR RECORDING AND PLAYING BACK OPTICAL INFORMATION

[75] Inventors: Kazuo Noda, Yokohama; Eiichi Nakamura, Sagamihara, both of Japan

[73] Assignee: Nippon Conlux Co., Ltd., Tokyo, Japan

[21] Appl. No.: 602,726

[22] Filed: Oct. 24, 1990

[30] Foreign Application Priority Data

Oct. 30, 1989 [JP] Japan .................................. 1-282167

[51] Int. Cl.⁵ .............................................. G11B 7/00
[52] U.S. Cl. .................................. 369/44.42; 369/44.37; 369/44.41; 369/112; 369/44.24; 250/201.5
[58] Field of Search ....... 369/44.24, 112, 44.37–44.42, 369/44.11, 44.14, 109, 44.23; 250/201.5

[56] References Cited

U.S. PATENT DOCUMENTS

| | | | |
|---|---|---|---|
| 4,450,547 | 5/1984 | Nakamura et al. | 369/44.24 |
| 4,504,938 | 3/1985 | Tajima | 369/44.37 |
| 4,724,533 | 2/1988 | Ohara et al. | 369/112 |
| 4,823,334 | 4/1989 | Tanaka et al. | 369/112 |
| 4,873,678 | 10/1989 | Nakamura et al. | 369/112 |

FOREIGN PATENT DOCUMENTS

0042738 3/1986 Japan .................. 369/44.37

Primary Examiner—Roy N. Envall, Jr.
Assistant Examiner—Thang V. Tran
Attorney, Agent, or Firm—Koda and Androlia

[57] ABSTRACT

The present invention relates to an optical head for recording and playing back optical information, the optical head comprising an illumination system which shines three beams of light comprising 0-dimensional diffraction light, +1-dimensional diffraction light, and −1-dimensional diffraction light onto an optical information recording medium, and a photoreceiver system which receives three beams of reflected light from the recording medium; the photoreceiver system being provided with an edge mirror whereby, of the three beams of reflected light from the recording medium, approximately one half of the 0-dimensional diffraction light and all of the +1-dimensional diffraction light is received by a first photoreceiver diode, without being affected by the edge mirror, and the remaining approximately one half of the 0-dimensional diffraction light and all of the −1-dimensional diffraction light is reflected by the edge mirror and is received by a second photoreceiver diode; wherein a focusing control signal, a tracking control signal, and an information signal are obtained from an output from the first photoreceiver diode or the second photoreceiver diode, or from combined outputs from the first photoreceiver diode and the second photoreceiver diode.

3 Claims, 7 Drawing Sheets

OPTICAL HEAD FOR RECORDING AND PLAYING BACK OPTICAL INFORMATION

The present invention relates to an optical head used for recording information onto an optical information recording medium, and playing back information therefrom.

BACKGROUND OF THE INVENTION

Description of the Prior Art

Figure 14:
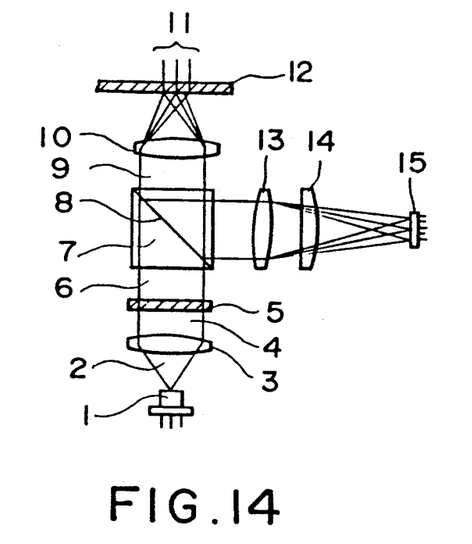
FIG. 14 shows an example of the optical-system construction of a conventional optical head.

In the conventional method of recording information onto an optical information recording medium (hereinafter abbreviated to "recording medium") and playing back information from that recording medium, an optical head of an optical-system construction is used, such as that shown in FIG. 14. The operation of the optical system of the optical head of FIG. 14 is described below. First, a divergent beam of light 2 emitted from a semiconductor laser 1 is converted by a collimator lens 3 into a parallel beam of light 4, and the parallel beam of light 4 is incident on a diffraction grating 5 and is converted thereby into three transmission diffraction beams of light at dimensions 0 and ±1.

These three transmission diffraction beams of light, in other words, three light beams 6, are incident on a beam splitter 7 and are both passed and reflected by a semitransparent diaphragm 8 of the beam splitter 7. Three beams of light 9 that are passed by the beam splitter 7 are focused by a focusing lens 10 into three very small spots of light 11 (hereinafter abbreviated to "light spots") arranged on a straight line, and are shone onto a recording medium 12. In this case, a high-output beam of light from the semiconductor laser 1 modulated by an information signal is used to record information, and a continuous low-output beam of light is used to play back the information. The central light spot of the three light spots 11 arranged in a straight line is a main light spot that is a 0-dimensional diffraction light spot used for recording and playing back information and for focusing, and the two auxiliary spots of light positioned on either side thereof are ±1-dimensional diffraction spots of light used for tracking.

The three beams of light shone onto the recording medium 12 as the three light spots 11 are partially reflected thereby, and the resultant three reflected beams of light are passed back through the focusing lens 10 which converts them back into approximately parallel beams of light. These beams of light are reflected by the semi-transparent diaphragm 8 of the beam splitter 7 to the right in the figure, are condensed by a photoreceiver lens 13, and reach a photoreceiver diode 15 through a cylindrical lens 14. An information signal, a focusing control signal that indicates the focusing status of the light spots 11, and a tracking control signal that indicates the positional status between a track provided on the recording medium 12 and the light spots 11 are obtained from the light-receiving diode 15. Note that the photoreceiver lens 13 is an optical element that acts to condense the three reflected parallel beams of light, and the cylindrical lens 14 is an optical element in which astigmatism occurs in order to provide a focusing control signal. Thus, the optical head shown in FIG. 14 uses an astigmatism method to derive a focusing control signal and a three-beam method to derive a tracking control signal.

Problem to be Solved by the Present Invention

The optical head of the above optical-system construction is widely used at present, but it has the defect that good focusing cannot be obtained because the astigmatism method used in focusing leads to a large amount of cross-talk. In other words, the tracking control signal leaks badly into the focusing control signal.

Figure 15:
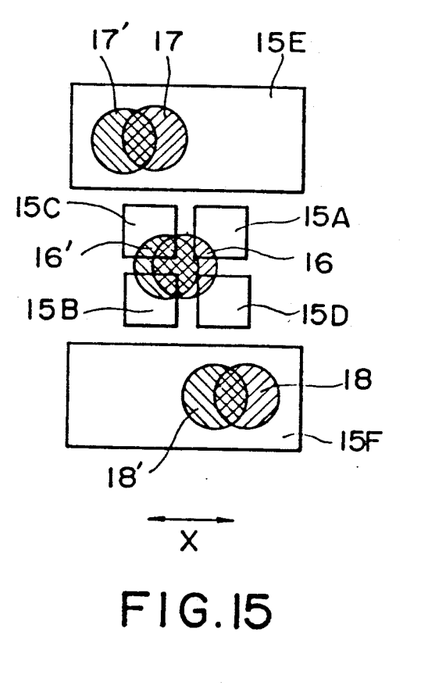
FIG. 15 shows the structure of a conventional photoreceiver diode and the light spots received thereby.

This leakage is due to the fact that, if the focusing lens 10 is driven in the direction perpendicular to the tracks provided on the recording medium 12, to ensure tracking, the light spots of the beams of light received by the photoreceiver diode 15 will also move. In other words, when both the astigmatism method and the three-beam method are used together, the photoreceiver diode 15 is formed of a divided element structure consisting of six elements 15A to 15F, and three light spots consisting of a light spot 16 from the main beam of light and light spots 17 and 18 from the auxiliary beams of light are shone onto the photoreceiver diode 15, as shown in FIG. 15. If the focusing lens 10 is driven to ensure tracking, these three light spots will move in the direction indicated by the X arrows, to become light spots 16', 17', and 18', for example.

Figure 16:
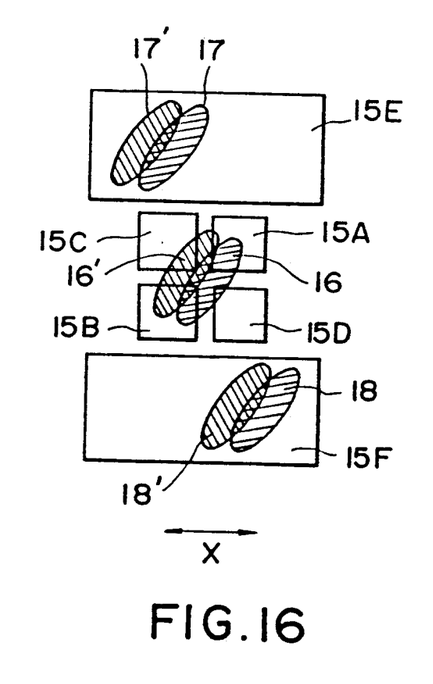
FIG. 16 illustrates a case in which the light spots of FIG. 15 have become ellipses, wherein movement of the light spots causes cross-talk.

If there is a non-focused condition, particularly due to the fact that the gap between the focusing lens 10 and the recording medium 12 is slightly change and the light spot 16 on the photoreceiver diode 15, used to derive the focusing control signal, has become elliptical-shaped, as shown in FIG. 16, the result of the equation:

[(element 15A output + element 15B output) −

(element 15C output + element 15D output) = focusing control signal output]

used to derive the focusing control signal output will differ between the cases in which the light spot is the elliptical light spot 16 and the elliptical light spot 16', and thus cross-talk will be generated.

SUMMARY OF THE INVENTION

The purpose of the present invention is to provide an optical head in which cross-talk does not occur, in other words, in which a tracking control signal does not leak into a focusing control signal, even when the focusing lens 10 is driven to enable tracking.

Means of Accomplishing the Present Invention

The above purpose is achieved by the optical head of the present invention in which light reflected from the recording medium is passed back through the focusing lens; is divided by a beam splitter; and is incident on an edge mirror having a linear edge positioned approximately half-way through the cross-section of the three beams of 0-dimensional diffraction light and ±1-dimensional diffraction light condensed by a photoreceiver lens in such a manner that, for example, one half of the 0-dimensional diffraction light and all of the +1-dimensional diffraction light pass directly without being affected by the edge mirror and the remaining half of the 0-dimensional diffraction light and all of the −1-dimensional diffraction light are reflected by the edge mirror; the direct light and the reflected light are received by photoreceiver diodes; each individual photoreceiver output generated by the 0-dimensional diffraction light, or a combination of both photoreceiver outputs generated by the 0-dimensional diffraction light, is used to obtain a focusing control signal and an information signal; and the differences between the individual photoreceiver outputs generated by the +1-dimensional diffraction light and the −1-dimensional diffraction light are combined to obtain a tracking control signal.

Mode of Use of the Present Invention

The photoreceiver diodes that extract the focusing control signal each have an element construction that is divided into two parts, with the division line therebetween positioned parallel to the edge of the edge mirror. When the focusing lens is driven to enable tracking, the light spots on the photoreceiver diodes move parallel to the division line, so there is no change in the output from each element and thus cross-talk does not occur.

When an edge mirror divides a beam of light into two parts, the optical energy is also halved. Therefore, the present invention combines photoreceiver output from direct light that has not been affected by the edge mirror with photoreceiver output from light that has been reflected from the edge mirror, to prevent any drop in efficiency.

The information signal is also obtained from the two-element photoreceiver diodes that derive the focusing control signal.

The photoreceiver diodes that extract the tracking control signal are positioned in close contact with the photoreceiver diodes used to extract the focusing control signal, and the tracking control signal is obtained from a combination of differences between photoreceiver outputs from a direct light side which is not affected by the edge mirror and a reflected light side which is reflected from the edge mirror.

BRIEF DESCRIPTION OF THE DRAWINGS,

In the accompanying drawings, FIGS. 13(a) and (b) are perspective drawings of edge mirrors.

DESCRIPTION OF THE PREFERRED EMBODIMENT

Figure 1:
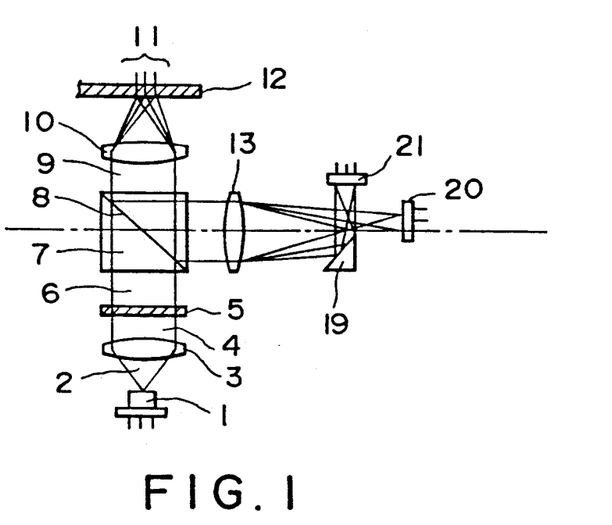
FIG. 1 shows the optical-system construction of the optical head of the present invention.

FIG. 1 shows the optical-system construction of the optical head of the present invention. The optical head of FIG. 1 is constructed of a semiconductor laser 1, a collimator lens 3, a diffraction grating 5, a beam splitter 7, a focusing lens 10, a photoreceiver lens 13, an edge mirror 19, and photoreceiver diodes 20 and 21.

The operation of the optical head of FIG. 1 is described below. A divergent beam of light 2 emitted from the semiconductor laser 1 is converted by the collimator lens 3 into a parallel beam of light 4, and the parallel beam of light 4 is incident on the diffraction grating 5 and is converted thereby into three transmission diffraction beams of light at dimensions 0 and ±1.

These three transmission diffraction beams of light, in other words, three light beams 6, are incident on the beam splitter 7 and are both passed and reflected by a semi-transparent diaphragm 8 of the beam splitter 7. (The ratio of strengths of the transmitted light and reflected light need not be 1, and the three reflected beams of light can be either absorbed or scattered.) Three beams of light 9 that are passed by the beam splitter 7 are focused by the focusing lens 10 into three light spots 11 arranged on a straight line, and are shone onto a recording medium 12. In this case, a high-output beam of light from the semiconductor laser 1 and modulated by an information signal is used to record information, and a continuous low-output beam of light is used to play back the information. The central light spot of the three light spots 11 arranged in a straight line is a main light spot that is a 0-dimensional diffraction light spot used for recording and playing back information and for focusing, and the two auxiliary spots of light positioned on either side thereof are the ±1-dimensional diffraction spots of light used for tracking.

The three beams of light shone onto the recording medium 12 as the three light spots 11 are partially reflected thereby, and the resultant three reflected beams of light are passed back through the focusing lens 10 which converts them back into approximately parallel beams of light. (Depending on the focusing state, these could become slightly convergent beams of light or slightly divergent beams of light.) These beams of light are reflected by the semi-transparent diaphragm 8 of the beam splitter 7 to the right in the figure, are condensed by a photoreceiver lens 13, and are divided in such a manner that, for example, half of the 0-dimensional diffraction light and all of the +1-dimensional diffraction light pass straight through the edge mirror 19, without being affected thereby, and reach the first photoreceiver diode 20 which is positioned in close proximity to the focal point of the photoreceiver lens 13, and the remaining half of the 0-dimensional diffraction light and all of the −1-dimensional diffraction light are reflected by the edge mirror 19 and reach the second photoreceiver diode 21 which is also positioned in close proximity to the focal point of the photoreceiver lens 13.

Figure 2:
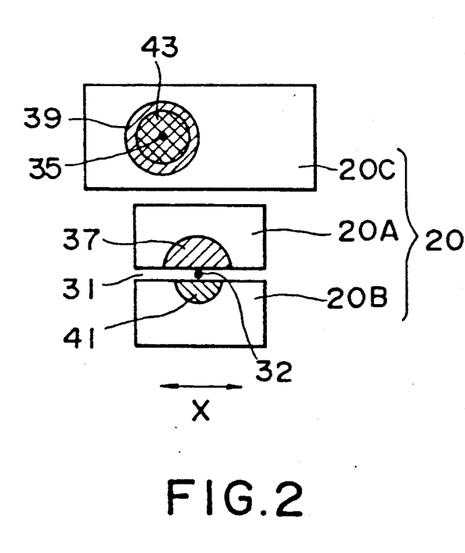
FIGS. 2, 3, 6, and 7 show examples of photoreceiver diodes composed of three elements, and the light spots received thereby.
Figure 3:
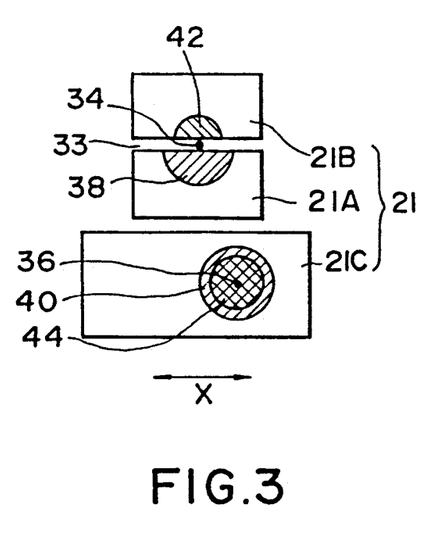

FIGS. 2 and 3 show examples of the structure of the photoreceiver diodes 20 and 21. The photoreceiver diode 20 is constructed of elements 20A, 20B, and 20C, as shown in FIG. 2, with the 0-dimensional diffraction light shining onto the elements 20A and 20B, and the +1-dimensional diffraction light shining onto the element 20C. Similarly, the photoreceiver diode 21 is constructed of elements 21A, 21B, and 21C, as shown in FIG. 3, with the 0-dimensional diffraction light shining onto the elements 21A and 21B, and the −1-dimensional diffraction light shining onto the element 21C.

Figure 4A:
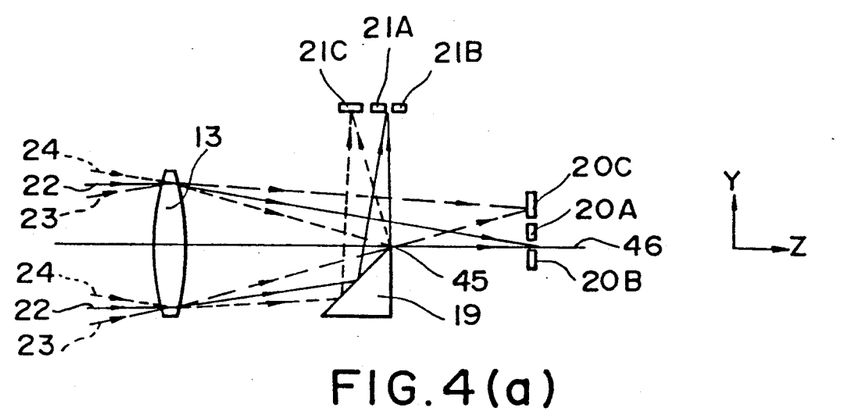
FIGS. 4(a)–(c) and 5(a)–(c) are diagrams that illustrate the paths of beams of light in the optical system used to derive a focusing control signal and a tracking control signal.
Figure 4B:
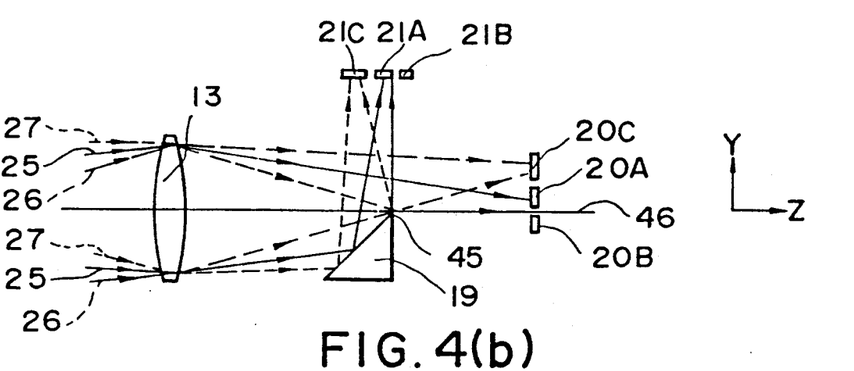
Figure 4C:
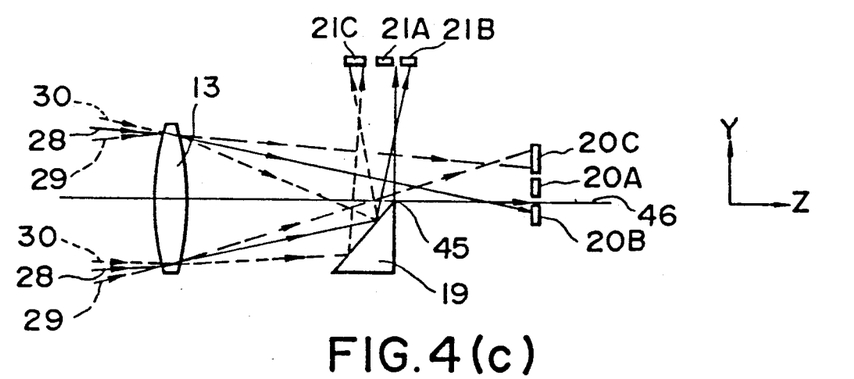

The paths of beams of light through the optical system used to derive the focusing control signal and the tracking control signal are shown in FIG. 4.

If the recording medium 12 shown in FIG. 1 is positioned at the focused position of the focusing lens 10, the three beams of light shone onto the recording medium 12 and partially reflected therefrom pass back through the focusing lens 10 and become parallel beams of light. They are then reflected by the semitransparent diaphragm 8 of the beam splitter 7 and are incident on the photoreceiver lens 13 in such a manner that the 0-dimensional diffraction light becomes a parallel beam of light 22, the +1-dimensional diffraction light becomes a parallel beam of light 23, and the −1-dimensional diffraction light becomes a parallel beam of light 24, as shown in FIG. 4(a).

If the recording medium 12 moves closer to the focusing lens 10, the three beams of light are incident on the photoreceiver lens 13 in such a manner that the 0-dimensional diffraction light becomes a divergent beam of light 25, the +1-dimensional diffraction light becomes a divergent beam of light 26, and the −1-dimensional diffraction light becomes a divergent beam of light 27, as shown in FIG. 4(b).

If the recording medium 12 moves further away from the focusing lens 10, the three beams of light are incident on the photoreceiver lens 13 in such a manner that the 0-dimensional diffraction light becomes a convergent beam of light 28, the +1-dimensional diffraction light becomes a convergent beam of light 29, and the −1-dimensional diffraction light becomes a convergent beam of light 30, as shown in FIG. 4(c).

In the state shown in FIG. 4(a), the parallel beam of light 22 incident on the photoreceiver lens 13 is condensed by the photoreceiver lens 13, and the upper half of the light condensed by the photoreceiver lens 13 proceeds past the edge mirror 19, without being affected thereby, to reach a boundary portion between the elements 20A and 20B of the photoreceiver diode 20, forming a very small light spot 32 on a boundary line 31 therebetween, as shown in FIG. 2. Therefore, no photoreceiver output is obtained from either the element 20A or the element 20B (in practice, diffraction and other phenomena will result in a certain amount of light shining on the elements 20A and 20B, but the photoreceiver output obtained therefrom will be approximately equal). The lower half of the light condensed by the photoreceiver lens 13 is reflected by the edge mirror 19 and reaches a boundary portion between the elements 21A and 21B of the photoreceiver diode 21, forming a very small light spot 34 on a boundary line 33 therebetween, as shown in FIG. 3. Therefore, no photoreceiver output is obtained from either the element 21A or the element 21B (in the same way as described above, a certain amount of light will shine thereon, but the photoreceiver outputs obtained therefrom will be approximately equal).

The focusing control signal is derived from the photoreceiver diodes 20 and 21 according to one of the following equations:

(Element 20A output + element 21A output) −     [Equation 1]
(element 20B output + element 21B output) = focusing control signal output (Element 20B output + element 21B output) −     [Equation 2]
(element 20A output + element 21A output) = focusing control signal output so that, in the case shown in FIG. 4(a), the focusing control signal output is zero.

Similarly, the parallel beam of light 23 and the parallel beam of light 24 incident on the photoreceiver lens 13 are condensed by the photoreceiver lens 13. The parallel beam of light 23 reaches the element 20C of the photoreceiver diode 20 and forms a very small light spot 35 on the element 20C, as shown in FIG. 2, and part of the parallel beam of light 24 that is reflected by the edge mirror 19 reaches the element 21C of the photoreceiver diode 21 and forms a very small light spot 36 on the element 21C, as shown in FIG. 3. The resultant photoreceiver outputs are used to derive the tracking control signal according to one of the following equations:

Element 20C output − element 21C output = tracking
control signal output     [Equation 3]

Element 21C output − element 20C output = tracking
control signal output     [Equation 4]

In the state shown in FIG. 4(b), the divergent beam of light 25 incident on the photoreceiver lens 13 is condensed by the photoreceiver lens 13, and the upper half of the light condensed by the photoreceiver lens 13 proceeds past the edge mirror 19, without being affected thereby, to reach the element 20A of the photoreceiver diode 20, forming a semi-circular light spot 37 on the element 20A, as shown in FIG. 2. The lower half of the light condensed by the photoreceiver lens 13 is reflected by the edge mirror 19 then reaches the element 21A of the photoreceiver diode 21, forming a semi-circular light spot 38 on the element 21A, as shown in FIG. 3. The focusing control signal is derived from either Equation 1 or Equation 2. In the same way, the divergent beams of light 26 and 27 incident on the photoreceiver lens 13 are condensed by the photoreceiver lens 13. The divergent beam of light 26 reaches the element 20C of the photoreceiver diode 20 and forms a light spot 39 on the element 20C, as shown in FIG. 2, and part of the divergent beam of light 27 that is reflected by the edge mirror 19 reaches the element 21C of the photoreceiver diode 21 and forms a light spot 40 on the element 21C, as shown in FIG. 3. The tracking control signal is derived from either Equation 3 or Equation 4.

In the state shown in FIG. 4(c), the convergent beam of light 28 incident on the photoreceiver lens 13 is condensed by the photoreceiver lens 13, and the upper half of the light condensed by the photoreceiver lens 13 proceeds past the edge mirror 19, without being affected thereby, to reach the element 20B of the photoreceiver diode 20, forming a semi-circular light spot 41 on the element 20B, as shown in FIG. 2. The lower half of the light condensed by the photoreceiver lens 13 is reflected by the edge mirror 19, contracts to the focal point then expands again, and finally reaches the element 21B of the photoreceiver diode 21, forming a semi-circular light spot 42 on the element 21B, as shown in FIG. 3. The focusing control signal is derived from either Equation 1 or Equation 2. In the same way, the convergent beams of light 29 and 30 incident on the photoreceiver lens 13 are condensed by the photoreceiver lens 13. The convergent beam of light 29 focuses to the focal point then expands again, and finally reaches the element 20C of the photoreceiver diode 20 and forms a light spot 43 on the element 20C, as shown in FIG. 2, and the convergent beam of light 30 is reflected by the edge mirror 19, focuses to the focal point then expands again, and finally reaches the element 21B of the photoreceiver diode 21 and forms a light spot 44 on the element 21C, as shown in FIG. 3. The tracking control signal is derived from either Equation 3 or Equation 4.

As described above, if the recording medium 12 is positioned at the focused position of the focusing lens 10, both of the photoreceiver diodes 20 and 21 are positioned in close proximity to the focal point of the photoreceiver lens 13, but in fact the photoreceiver diodes 20 and 21 do not necessarily need to be positioned close to the focal point of the photoreceiver lens 13. Similarly, the edge mirror 19 shown in FIG. 4 is positioned with a linear edge portion 45 thereof perpendicular to the plane of the figure and in contact with an optical axis 46, but the edge mirror 19 could be moved a suitable distance in the vertical direction shown in FIG. 4 (Y direction) or along the optical axis (Z direction). In addition, the photoreceiver diodes 20 and 21 could be moved suitable distances in either the Y direction or the Z direction.

Figure 5A:
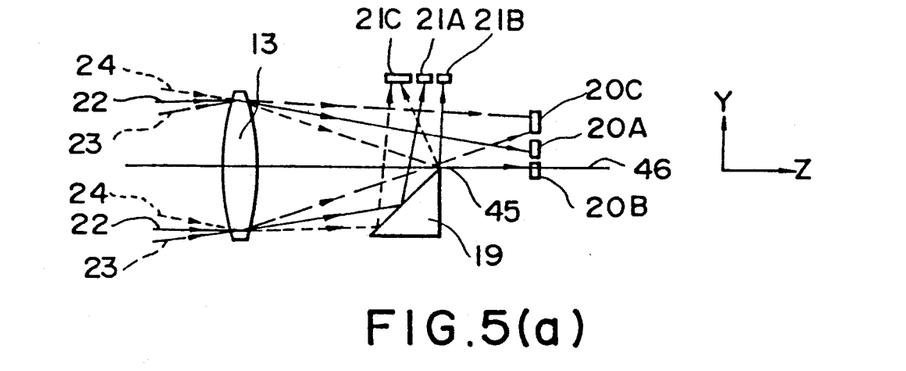
Figure 5B:
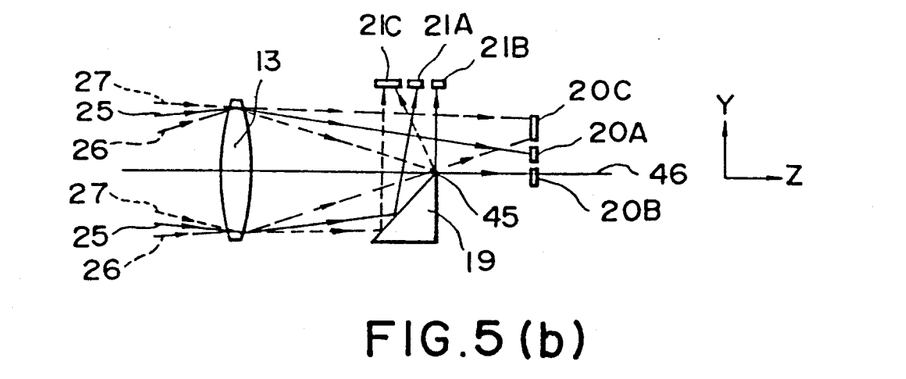
Figure 5C:
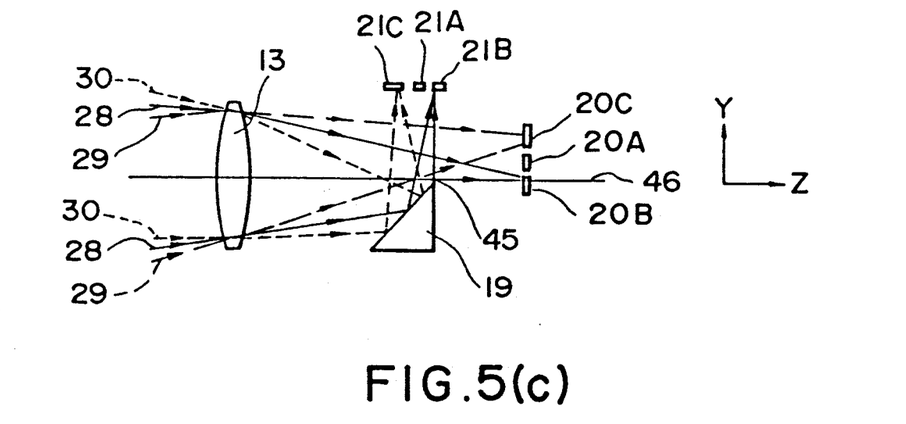

If the photoreceiver diodes 20 and 21 are not positioned close to the focal point of the photoreceiver lens 13, the paths of beams of light in the resultant optical system will be as shown in FIG. 5. In this case, the edge mirror 19 is moved a suitable distance in the Z direction and the photoreceiver diodes 20 and 21 are moved suitable distances in both the Y and Z directions, in comparison with their positions in FIG. 4.

Figure 6:
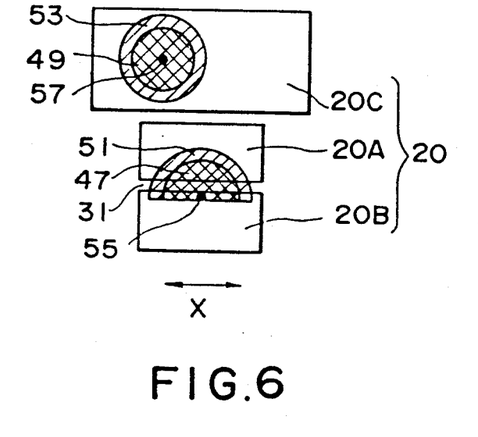
Figure 7:
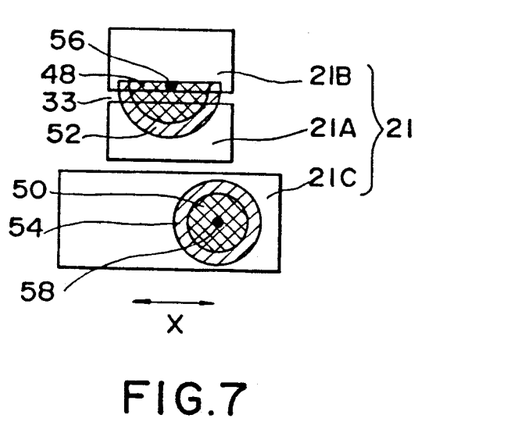

FIGS. 6 and 7 show the light spots formed on the photoreceiver diodes 20 and 21 positioned as shown in FIG. 5.

In the state shown in FIG. 5(a), the parallel beam of light 22 incident on the photoreceiver lens 13 is condensed by the photoreceiver lens 13, and the upper half of the light condensed by the photoreceiver lens 13 proceeds past the edge mirror 19, without being affected thereby, to reach the photoreceiver diode 20, forming a semi-circular light spot 47 extending over the elements 20A and 20B with equal amounts of light shining on the elements 20A and 20B, as shown in FIG. 6. The lower half of the light condensed by the photoreceiver lens 13 is reflected by the edge mirror 19 and reaches the photoreceiver diode 21, forming a semi-circular light spot 48 extending over the boundary line 33 between the elements 21A and 21B with equal amounts of light shining on the elements 21A and 21B, as shown in FIG. 7. The focusing control signal is derived from either Equation 1 or Equation 2. However, in this case, the focusing control signal output is zero. In the same way, the parallel beams of light 23 and 24 incident on the photoreceiver lens 13 are condensed by the photoreceiver lens 13. The parallel beam of light 23 reaches the photoreceiver diode 20 and forms a light spot 49 on the element 20C, as shown in FIG. 6, and the parallel beam of light 24 is reflected by the edge mirror 19 then reaches the element 21C of the photoreceiver diode 21, forming a light spot 50 on the element 21C, as shown in FIG. 7. The tracking control signal is derived from either Equation 3 or Equation 4.

In the state shown in FIG. 5(b), the divergent beam of light 25 incident on the photoreceiver lens 13 is condensed by the photoreceiver lens 13, and the upper half of the light condensed by the photoreceiver lens 13 proceeds past the edge mirror 19, without being affected thereby, to reach the photoreceiver diode 20, forming a semi-circular light spot 51 extending over the element 20a and the element 20B, with the quantity of light shining on the element 20A being greater than that shining on the element 20B, as shown in FIG. 6. The lower half of the light condensed by the photoreceiver lens 13 is reflected by the edge mirror 19 then reaches the element 21A of the photoreceiver diode 21, forming a semi-circular light spot 52 on the element 21A and the element 21B, with the quantity of light shining on the element 21A being greater than that shining on the element 21B, as shown in FIG. 7. The focusing control signal is derived from either Equation 1 or Equation 2. In the same way, the divergent beams of light 26 and 27 incident on the photoreceiver lens 13 are condensed by the photoreceiver lens 13. The divergent beam of light 26 reaches the element 20C of the photoreceiver diode 20 and forms a light spot 53 on the element 20C, as shown in FIG. 6, and the divergent beam of light 27 is reflected by the edge mirror 19 then reaches the element 21C of the photoreceiver diode 21, forming a light spot 54 on the element 21C, as shown in FIG. 7. The tracking control signal is derived from either Equation 3 or Equation 4.

In the state shown in FIG. 5(c), the convergent beam of light 28 incident on the photoreceiver lens 13 is condensed by the photoreceiver lens 13, and the upper half of the light condensed by the photoreceiver lens 13 proceeds past the edge mirror 19, without being affected thereby, to reach the photoreceiver diode 20, forming a small semi-circular light spot 55 on only the element 20B, as shown in FIG. 6. The lower half of the light condensed by the photoreceiver lens 13 is reflected by the edge mirror 19 then reaches the photoreceiver diode 21, forming a small semi-circular light spot 56 on only the element 21B, as shown in FIG. 7. The focusing control signal is derived from either Equation 1 or Equation 2. In the same way, the convergent beams of light 29 and 30 incident on the photoreceiver lens 13 are condensed by the photoreceiver lens 13. The convergent beam of light 29 reaches the element 20C of the photoreceiver diode 20 and forms a small light spot 57 on the element 20C, as shown in FIG. 6, and the convergent beam of light 30 is reflected by the edge mirror 19 then reaches the element 21C of the photoreceiver diode 21 and forms a small light spot 58 on the element 21C, as shown in FIG. 7. The tracking control signal is derived from either Equation 3 or Equation 4.

The photoreceiver diode 20 is constructed of the elements 20A, 20B, and 20C, as shown in FIGS. 2 and 6, with the elements 20a and 20B receiving the 0-dimensional diffraction light and the element 20C receiving the +1-dimensional diffraction light. The −1-dimensional diffraction light is reflected by the edge mirror 19 then is received by the element 21C of the photoreceiver diode 21, as described above.

Figure 8:
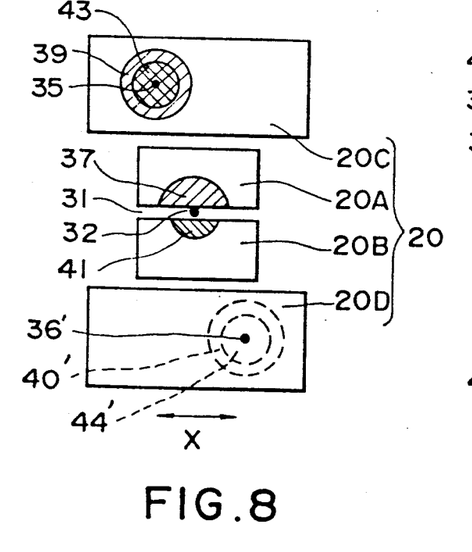
FIGS. 8 and 9 show examples of photoreceiver diodes composed of four elements, and the light spots received thereby.

However, in practice, not all of the −1-dimensional diffraction light is reflected by the edge mirror 19; a component thereof leaks toward the photoreceiver diode 20 side. For this reason, the photoreceiver diode 20 is provided with another element 20D, as shown in FIG. 8, and the leaking component of the −1-dimensional diffraction light forms light spots 36', 40', and 44' on the element 20D. This arrangement is designed to enable the resultant output to be combined with the photoreceiver output of the element 21C of the photoreceiver diode 21 to increase the photoreceiver efficiency.

Similarly, the photoreceiver diode 21 is constructed of the elements 21A, 21B, and 21C, as shown in FIGS. 3 and 7, with the elements 21A and 21B receiving the 0-dimensional diffraction light after it has been reflected by the edge mirror 19, and the element 21C receiving the −1-dimensional diffraction light. The +1-dimensional diffraction light is received by the element 20C of the photoreceiver diode 20, without being affected by the edge mirror 19, as described above.

Figure 9:
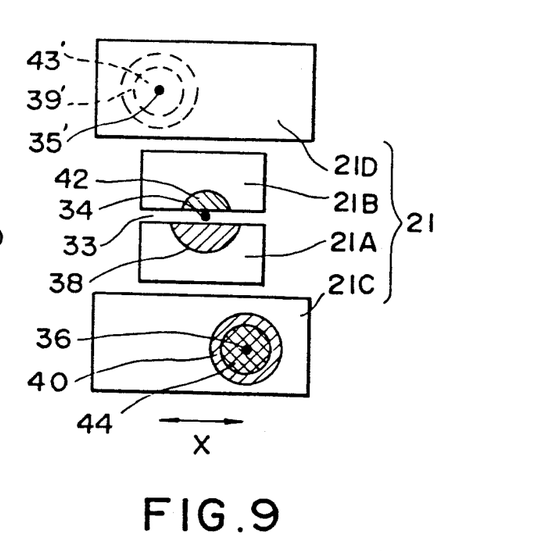

However, in practice, the +1-dimensional diffraction light is also affected by the edge mirror 19, and a component thereof leaks toward the photoreceiver diode 21 side. For this reason, the photoreceiver diode 21 is provided with another element 21D, as shown in FIG. 9, and the leaking component of the +1-dimensional diffraction light forms light spots 35', 39', and 43' on the element 21D. This arrangement is designed to enable the resultant output to be combined with the photoreceiver output of the element 20C of the photoreceiver diode 20 to increase the photoreceiver efficiency.

Note that the above reception of light from the leakage components by providing the elements 20D and 21D of the photoreceiver diodes 20 and 21 can also be applied to the photoreceiver diodes shown in FIGS. 6 and 7.

The focusing control signal, the tracking control signal, and also the information signal are derived from the photoreceiver diodes 20 and 21.

Figure 10:
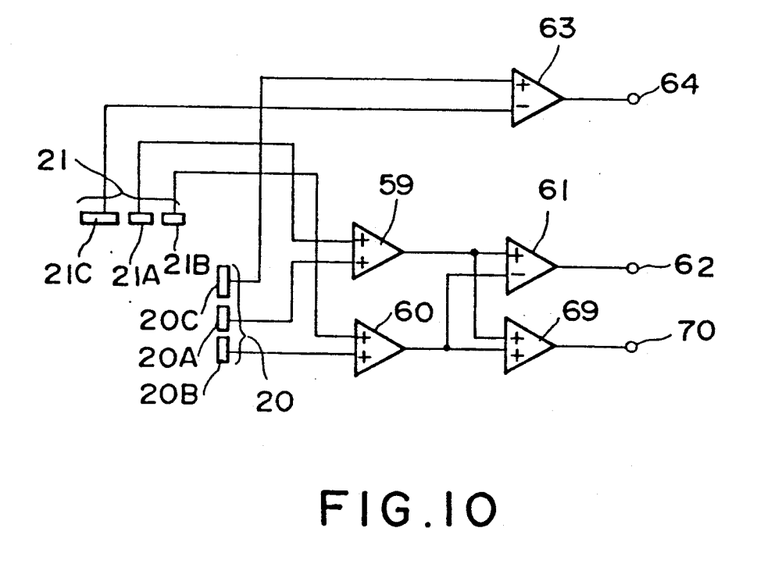
FIGS. 10 and 11 show examples of circuit configurations for creating a focusing control signal, a tracking control signal, and an information signal from the outputs of the photoreceiver diodes.
Figure 11:
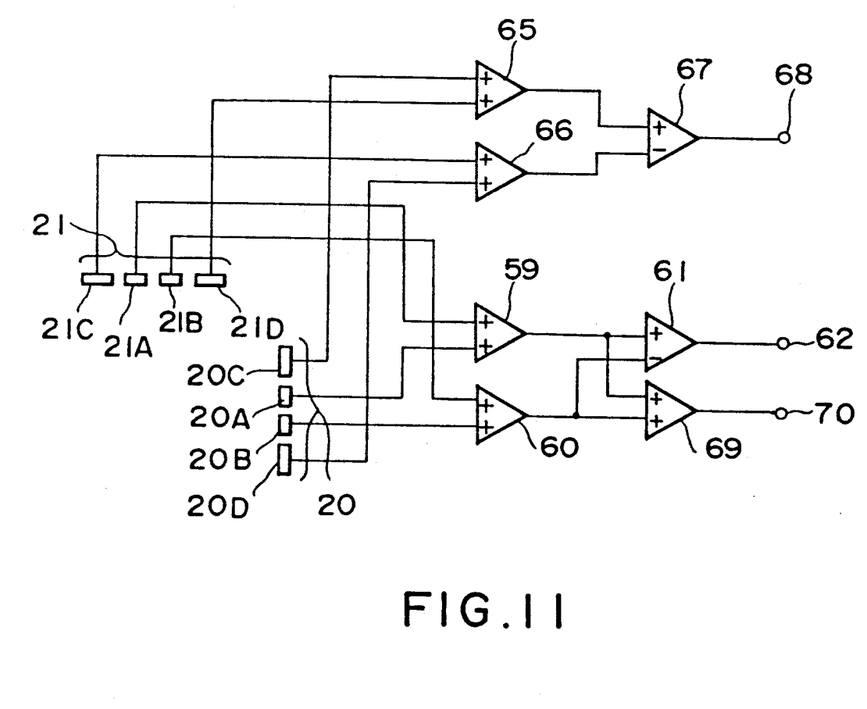

The circuit constructions shown in FIGS. 10 and 11 are used to derive the focusing control signal, the tracking control signal, and the information signal.

In FIGS. 10 and 11, the photoreceiver outputs of the element 20A of the photoreceiver diode 20 and the element 21A of the photoreceiver diode 21 are first added by an adder 59, and the photoreceiver outputs of the element 20B of the photoreceiver diode 20 and the element 21B of the photoreceiver diode 21 are added by an adder 60. Outputs from the adders 59 and 60 are input to a subtractor 61, and the subtractor 61 derives the difference between the output from the adder 59 and the output from the adder 60 to obtain a focusing control signal output 62. Note that the focusing control signal output 62 could also be calculated according to the following equation, using two subtractors and one adder:

(Element 20A output − element 20B output) +     [Equation 5]
   (element 21A output − element 21B output) =
   (element 20A output − element 21B output) +
   (element 21A output − element 20B output) = focusing control signal output

Next, to obtain the tracking control signal output from the circuit of FIG. 10, the photoreceiver outputs of the element 20C of the photoreceiver diode 20 and the element 21C of the photoreceiver diode 21 are input to a subtractor 63, and the difference between these two photoreceiver outputs is derived by a subtractor 63 to obtain a tracking control signal output 64. Either Equation 3 or Equation 4 expresses how this output is derived.

In the circuit shown in FIG. 11, the photoreceiver outputs of the element 20C of the photoreceiver diode 20 and the element 21D of the photoreceiver diode 21 are added by an adder 65, the photoreceiver outputs of the elements 21C and 20D are added by an adder 66, outputs from the adders 65 and 66 are input to a subtractor 67, and the subtractor 67 derives the difference between these two inputs as a tracking control signal output 68. This is expressed by the following equation:

(Element 20C output + element 21D output) −     [Equation 6]
   (element 21C output + element 20D output) = tracking control signal output

Note that the tracking control signal output 68 could also be calculated according to the following equation, using two subtractors and one adder:

(Element 20C output − element 21C output) +     [Equation 7]
   (element 21D output − element 20D output) =
   (element 20C output − element 20D output) +
   (element 21D output − element 21C output) = tracking control signal output

The information signal output is obtained from the circuits of FIGS. 10 and 11 by inputting the outputs from the adders 59 and 60 to an adder 69, and extracting the output from the adder 69 as an information signal 70.

Figure 12:
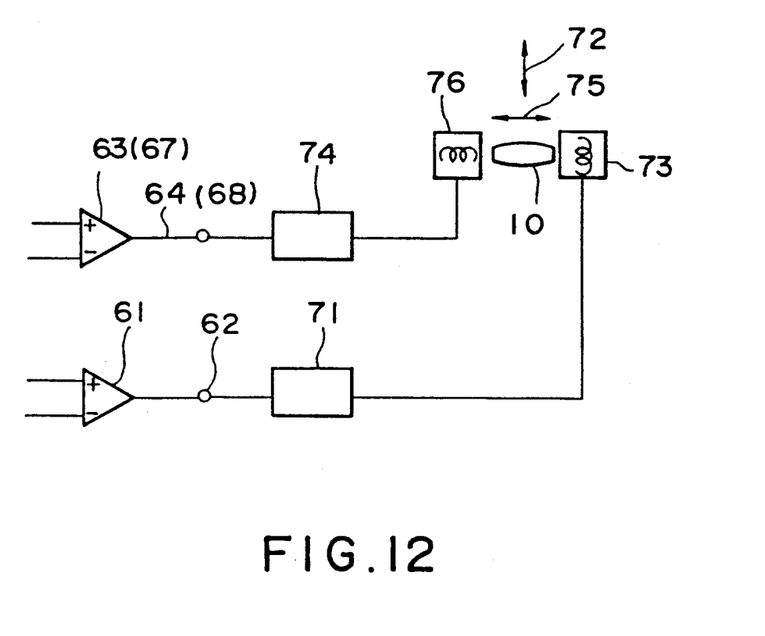
FIG. 12 is a diagram used to illustrate focusing control and tracking control.

The output 62 from the subtractor 61 of FIGS. 10 and 11, in other words, the focusing control signal output 62, is suitably amplified by a servo amplifier 71 shown in FIG. 12 and is applied to a focusing coil 73 to drive the focusing lens 10 of the optical head along the optical axis in the directions shown by arrows 72. This forms a focusing control loop, to control the system to ensure that sharp light spots are always shone onto the recording medium 12.

The output 64 from the subtractor 63 or the output 68 from the subtractor 67 of FIGS. 10 and 11, in other words, the tracking control signal output 64 or 68, is suitably amplified by a servo amplifier 74 shown in FIG. 12 and is applied to a tracking coil 76 to drive the focusing lens 10 of the optical head perpendicular to the optical axis in the directions shown by arrows 75. This forms a tracking control loop, to control the system to ensure that the light spots accurately trace the tracks provided on the recording medium 12.

Figures 13A, 13B:
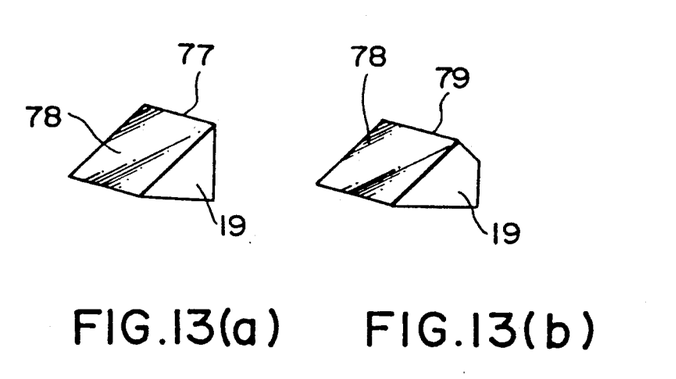

The edge mirror 19 could be a right triangular prism with a linear edge portion 77, as shown in FIG. 13(a), in which an inclined surface 78 thereof is employed as a reflection diaphragm. It could also be as shown in FIG. 13(b) in which the prism is beveled to form a linear edge portion 79, to prevent the generation of chips and other defects in the edge portion.

The beam splitter 7 has been described above as a beam splitter that uses a semi-transparent diaphragm 8, but any suitable light isolator such as a polarized beam splitter using a polarized membrane and a ¼-wavelength plate could be used instead. Such light isolators would help to reduce optical losses and also reduce the return of light back toward the semiconductor laser 1. In addition, the photoreceiver diodes 20 and 21 have been described above as "diodes", but it should go without saying that any other type of photoreceiver elements, such as solar cells, could be used instead.

The above description shows how the photoreceiver outputs of the photoreceiver diodes 20 and 21 are combined from consideration of the efficiency of obtaining the focusing control signal. However, if importance is placed on an easy-to-adjust system, rather than a more efficient system, either the photoreceiver output from the photoreceiver diode 20 alone or the photoreceiver output from the photoreceiver diode 21 alone could be used. In other words, either of the following equations could be used:

±element 20A output ∓element 20B output=focusing control signal output

±element 21A output ∓element 21B output=focusing control signal output

Effect of the Present Invention

As described above, the present invention enables the provision of an optical head in which a focusing control signal is derived by using an edge mirror and photoreceiver diodes that are divided into two parts, so no cross-talk is generated even when the focusing lens is driven to ensure tracking. In addition, since an edge mirror is used, both a beam of light that travels directly and a beam of light reflected by the edge mirror can be utilized efficiently without any losses, making this optical head suitable for a three-beam method with an excellent level of stability.

What is claimed is:

1. An optical head for recording and playing back optical information, said optical head comprising:

an illumination system which has a light source for providing a parallel beam, grating means for deriving three beams of light including 0-dimensional diffraction light, +1-dimensional diffraction light and −1-dimensional diffraction light from the parallel light beam, and means for guiding the three beams onto an optical information recording medium, and a photoreceiver system having an edge mirror, a first photodiode for receiving a half of the 0-dimensional diffraction light and all of the +1-dimensional diffraction light without being affected by said edge mirror, and a second photodiode for receiving the remaining approximately one half of the 0-dimensional diffraction light and all of the −1-dimensional diffraction light, both being reflected by the edge mirror, said photoreceiver system being further provided with:

a first photoreceiver diode having a cell for receiving all of the +1 dimensional diffraction light and two cells for receiving half of the 0-dimensional diffraction light;

a second photoreceiver diode having a cell for receiving all of the −1 dimensional diffraction light and two cells for receiving the remaining half of the 0-dimensional diffraction light; and signal generating means having a first operational circuit which produces and information signal by adding up outputs from cells for receiving the 0-dimensional diffraction light, and a focusing control signal by comparing outputs from cells for receiving the 0-dimensional diffraction light, and a second operational circuit which produces a tracking control signal by comparing outputs from the respective cells for receiving the +1 and −1 dimensional diffraction lights.

2. An optical head of claim 1, wherein the two cells of the first and second photoreceiver diodes are so arranged to be parallely positioned to the edge of the edge mirror.

3. An optical head of claim 1, the respective diodes being further provided with another cell for receiving leakage components of the +1 and −1 diffraction lights.

* * * * *